US011627638B2

(12) United States Patent
Petrus et al.

(10) Patent No.: US 11,627,638 B2
(45) Date of Patent: Apr. 11, 2023

(54) INTEGRATED SYSTEM WITH AN ACCESS POINT POWERED BY A RADIO NODE

(71) Applicant: ARRIS Enterprises LLC, Suwanee, GA (US)

(72) Inventors: Paul Petrus, San Jose, CA (US); Juan C. Santiago, Laguna Niguel, CA (US); David James Botha, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 204 days.

(21) Appl. No.: 17/209,280

(22) Filed: Mar. 23, 2021

(65) Prior Publication Data

US 2021/0307111 A1 Sep. 30, 2021

Related U.S. Application Data

(60) Provisional application No. 62/994,083, filed on Mar. 24, 2020.

(51) Int. Cl.
| | |
|---|---|
| *H04W 92/20* | (2009.01) |
| *H04W 84/04* | (2009.01) |
| *H04W 88/08* | (2009.01) |
| *H04L 12/10* | (2006.01) |
| *G06F 1/26* | (2006.01) |
| *H04L 12/40* | (2006.01) |
| *H04W 84/12* | (2009.01) |

(52) U.S. Cl.
CPC ............ *H04W 88/08* (2013.01); *G06F 1/266* (2013.01); *H04L 12/10* (2013.01); *H04L 12/40045* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 9,650,794 | B2* | 5/2017 | Stojanovski | ............ H04W 4/70 |
| 10,555,321 | B2* | 2/2020 | Andou | ............... H04W 72/044 |
| 2015/0373607 | A1* | 12/2015 | Zhu | ........................ H04W 36/22 |
| | | | | 370/329 |
| 2016/0286340 | A1* | 9/2016 | Zhu | .......................... H04W 4/80 |
| 2018/0139708 | A1* | 5/2018 | Zhan | ..................... H04L 12/413 |
| 2018/0234869 | A1* | 8/2018 | Sirotkin | ................ H04W 24/10 |
| 2022/0124542 | A1* | 4/2022 | Li | ........................... H04W 4/80 |

* cited by examiner

Primary Examiner — Ajit Patel
(74) Attorney, Agent, or Firm — Steven Stupp; Stewart Wiener

(57) ABSTRACT

An integrated system is described. This integrated system includes: a radio node that communicates using a cellular-telephone communication protocol; and an access point that communicates using an IEEE 802.11 communication protocol. Moreover, the integrated system includes a housing between the radio node and the access point, where the housing provides mechanical coupling and electrical coupling between the radio node and the access point, and the housing provides electrical power and data to the access point from the radio node. For example, the housing may provide the electrical power and the data using a PoE cable. In some embodiments, the radio node dynamically modifies the electrical power provided to the access point or receives, from a controller, an instruction specifying the electrical power to be provided to the access point.

20 Claims, 6 Drawing Sheets

INTEGRATED SYSTEM WITH AN ACCESS POINT POWERED BY A RADIO NODE

CROSS REFERENCE TO RELATED APPLICATIONS

This application claims priority under 35 U.S.C. 119(e) to: U.S. Provisional Application Ser. No. 62/994,083, "Integrated System with an Access Point Powered by a Radio Node," filed on Mar. 24, 2020, by Paul Petrus, et al., the contents of which are herein incorporated by reference.

FIELD

The described embodiments relate to techniques for integrating electronic devices. Notably, the described embodiments relate to techniques for electrically and mechanically coupling a radio node and an access point in an integrated system, and for providing power from the radio node to the access point.

BACKGROUND

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

For example, in a WLAN based on an IEEE 802.11 standard, one or more electronic devices (which are sometimes referred to as stations, clients or recipient electronic devices) discover, associate with and communicate with one or more access points. In addition, while many electronic devices communicate with each other via large networks owned by a network operator, small-scale networks associated with entities are increasingly common. Notably, a cellular-telephone network provided by a mobile network operator includes so-called 'macrocells' with base stations, while a small cell is a type of small-scale network provided by a different entity, such as a company or an organization. A small cell includes radio access nodes (which are henceforth referred to as 'radio nodes') that provide lower power than macrocells and, thus, provide smaller coverage areas than macrocells.

However, the different electronic devices used to support different communication protocols increase the complexity and expense when deploying these types of networks.

SUMMARY

An integrated system is described. This integrated system includes: a radio node that communicates using a cellular-telephone communication protocol; and an access point that communicates using an IEEE 802.11 communication protocol. Moreover, the integrated system includes a housing between the radio node and the access point, where the housing provides mechanical coupling and electrical coupling between the radio node and the access point, and the housing provides electrical power and data to the access point from the radio node.

For example, the housing may provide the electrical power and the data using Power over Ethernet (PoE).

Moreover, the mechanical coupling may include rigid mechanical coupling and/or remateable mechanical coupling.

Furthermore, the housing may include connectors that couple to an output connector from the radio node and an input connector to the access point, and the connectors may correct for a spatial offset in the positions of the output connector and the input connector.

Additionally, when mechanically coupled to the housing, the radio node and the access point may have a common form factor.

In some embodiments, the radio node dynamically modifies the electrical power provided to the access point based at least in part on: a temperature of the radio node, a configuration of the access point, loading of the radio node, loading of the access point, current power consumption of the radio node, current power consumption of the access point, modeling of power consumption of the radio node, and/or modeling of power consumption of the access point.

Alternatively or additionally, the radio node may receive, from a controller, an instruction specifying the electrical power to be provided to the access point. Then, the radio node may dynamically modify or adjust the electrical power provided to the access point based at least in part on the instruction.

Note that the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

Another embodiment provides the housing.
Another embodiment provides the controller.
Another embodiment provides the radio node.
Another embodiment provides the access point.
Another embodiment provides a computer-readable storage medium for use with the radio node, the access point, or controller. This computer-readable storage medium may include program instructions that, when executed by the radio node, the access point, or the controller, cause the radio node, the access point, or the controller to perform at least some of the aforementioned operations.

Another embodiment provides a method. This method includes at least some of the operations performed by the radio node, the access point, or the controller.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
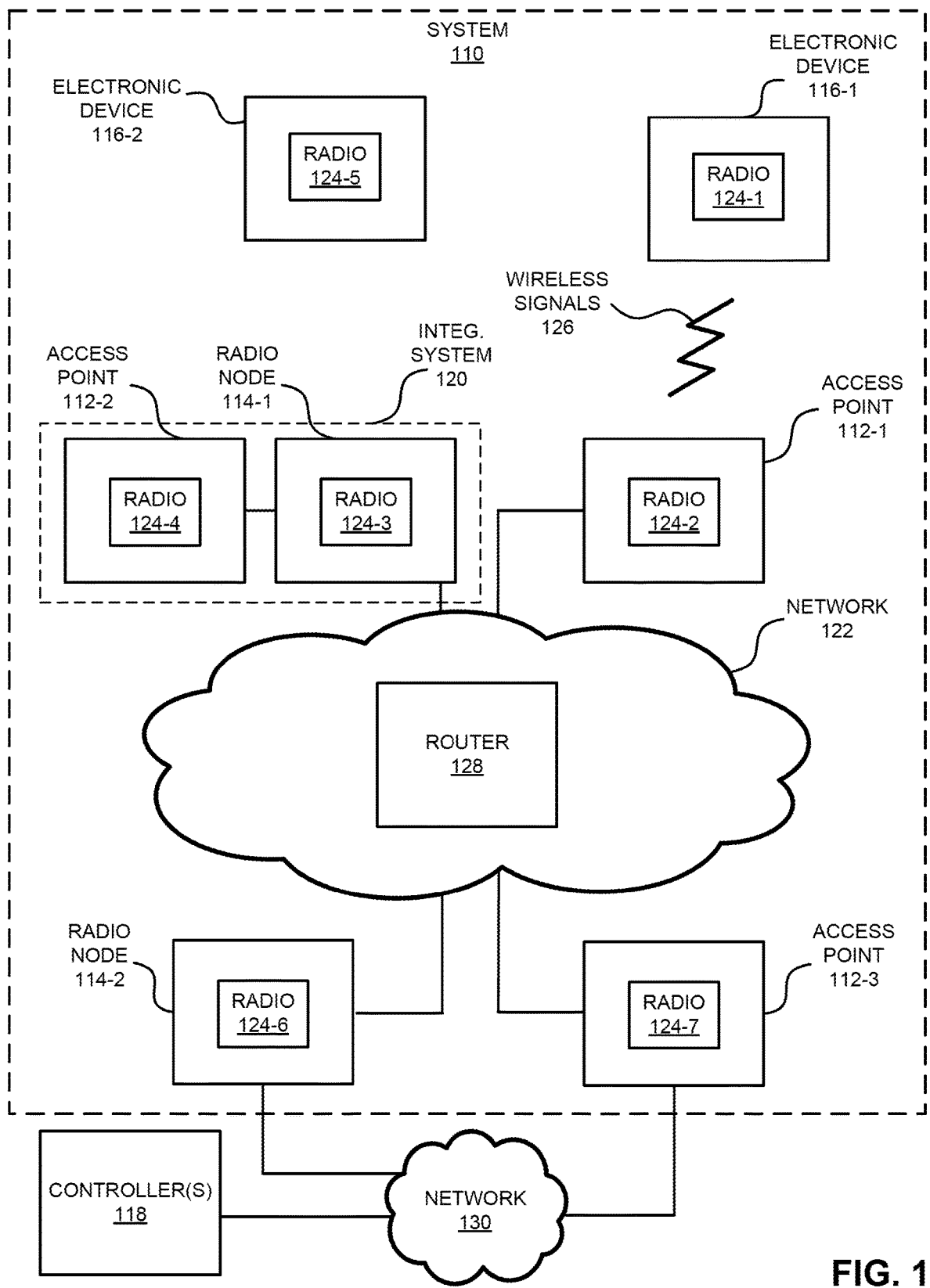
FIG. 1 is a block diagram illustrating a system in accordance with an embodiment of the present disclosure.

An integrated system is described. This integrated system includes: a radio node that communicates using a cellular-telephone communication protocol; and an access point that communicates using an IEEE 802.11 communication protocol. Moreover, the integrated system includes a housing between the radio node and the access point, where the housing provides mechanical coupling and electrical coupling between the radio node and the access point, and the housing provides electrical power and data to the access point from the radio node. For example, the housing may provide the electrical power and the data using a PoE cable. In some embodiments, the radio node dynamically modifies the electrical power provided to the access point or receives, from a controller, instructions for the electrical power to be provided to the access point.

By combining the radio node and the access point in the integrated system, these packaging techniques may simply and reduce the cost of deploying or installing the radio node and the access point. Notably, the integrated system may allow a single unit with common electrical power and data to support both the radio node and the access point. Moreover, by providing the electrical power and the data from the radio node to the access point, the integrated system may address the problem that some access points do not support outputting PoE. Consequently, the integrated system may enable the use of different communication protocols in different types of networks.

In the discussion that follows, electronic devices or components in a system (such as an access point in the integrated system) communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Tex.), Bluetooth® (from the Bluetooth Special Interest Group of Kirkland, Wash.), and/or another type of wireless interface (such as another wireless-local-area-network interface). Moreover, an access point in the system may communicate with other access points and/or a controller or services using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Ethernet and Wi-Fi are used as illustrative examples.

Moreover, other electronic devices or components in the system (such as a radio node in the integrated system) communicate packets in accordance with a data communication protocol in a cellular-telephone network. Notably, in the discussion that follows, the radio node may communicate using Long Term Evolution or LTE (from the 3rd Generation Partnership Project of Sophia Antipolis, Valbonne, France). Consequently, an eNodeB or eNB is used as an illustrative example of the radio node. However, a wide variety of communication techniques or protocols may be readily used for the various embodiments. For example, the radio node may communicate using: a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as another communication protocol). Thus, the radio nodes may include: an eNodeB, a UMTS NodeB and RNC, an NR gNB or gNodeB, etc. Furthermore, the radio node may communicate with other radio nodes and/or computers in a network using a wired communication protocol, such as an IEEE 802.3 standard and/or another type of wired interface. In the discussion that follows, Ethernet is used as an illustrative example.

We now describe some embodiments of the packaging techniques. FIG. 1 presents a block diagram illustrating an example of a system 110, which may include components, such as: one or more access points 112, one or more radio nodes 114, one or more electronic devices 116 (which are sometimes referred to as 'user equipment' or 'stations,' such as cellular telephones and, more generally, fixed or portable electronic devices), and one or more optional controllers 118. Moreover, access point 112-1 and radio node 114-1 may be included in integrated system 120. Note that in some embodiments, one or more of radio nodes 114 may perform the functions of a switch or a router.

In system 110, access points 112 may wirelessly communicate with electronic devices 116 using a wireless communication protocol that is compatible with an IEEE 802.11 standard. Thus, this wireless communication may occur in a 2.4 GHz, a 5 GHz, 6 GHz and/or a 60 GHz frequency band. (Note that IEEE 802.11ad communication over a 60 GHz frequency band is sometimes referred to as 'WiGig.' In the present discussion, these embodiments also encompassed by 'Wi-Fi.') However, a wide variety of frequency bands may be used. Moreover, radio nodes 114 may wirelessly communicate with electronic devices 116 using a wireless communication protocol that is compatible with a cellular-telephone communication protocol, such as LTE. Thus, this wireless communication may occur in an LTE operating band, such as 0.6 GHz, 0.7 GHz, 0.85 GHz, 1.9 GHz, 1.7/2.1 GHz, a Citizens Broadband Radio Spectrum or CBRS near 3.5 GHz (such as the 150 MHz of bandwidth between 3.55 GHz and 3.7 GHz), etc.

Furthermore, in system 1010, wired and/or wireless communication among access points 112 in a WLAN may occur via network 122 (such as an intra-net, a mesh network, point-to-point connections and/or the Internet) and may use a network communication protocol, such as Ethernet. This network may include one or more routers and/or switches, such as router 128. Additionally, wired and/or wireless communication among radio nodes 114 in a small-scale network (such as a small cell) may occur via network 122 and may use the network communication protocol.

As noted previously, the access points 112 and electronic devices 116 may communicate via wireless communication. Notably, a given one of access points 112 and a given one of electronic devices 116 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

In some embodiments, the wired and/or wireless communication among access points 112 also involves the use of dedicated connections, such as via a peer-to-peer (P2P) communication technique. Therefore, access points 112 may support wired communication within the WLAN (such as Ethernet) and wireless communication within the WLAN (such as Wi-Fi), and one or more of access points 112 may also support a wired communication protocol (such as Ethernet) for communicating via network 130 (such as the Internet) with other electronic devices, such as a computer or the one or more optional controllers 118. Note that the one or more optional controllers 118 may be at the same location as the other components in system 110 or may be located remotely (i.e., at a different location). Moreover, note that access points 112 may be managed by the one or more optional controllers 118. Furthermore, note that a given one of access points 112 may be a physical access point or a virtual or 'software' access point that is implemented on a computer or another electronic device.

Figure 6:
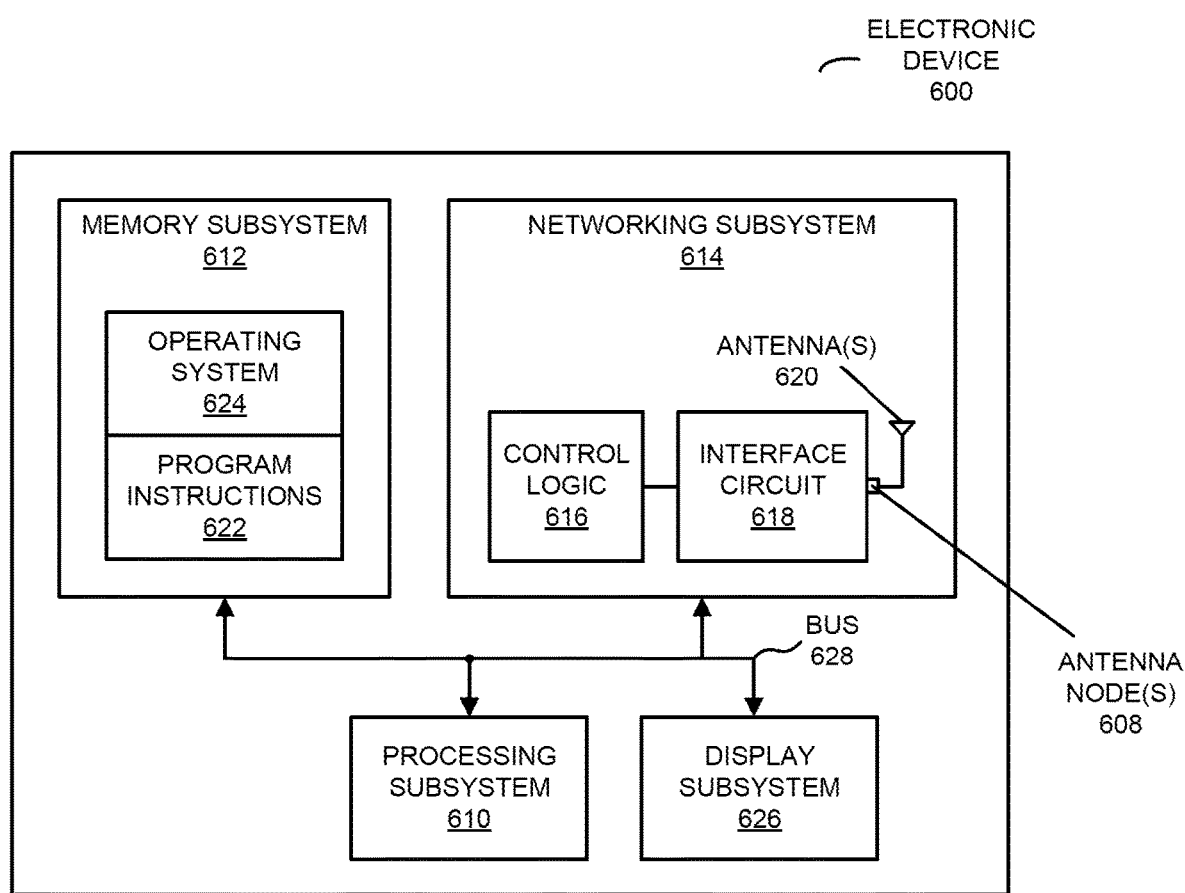
FIG. 6 is a block diagram illustrating an electronic device in accordance with an embodiment of the present disclosure.

As described further below with reference to FIG. 6, the one or more access points 112, the one or more radio nodes 114, the one or more electronic devices 116 and/or the one or more optional controllers 118 may include subsystems, such as a networking subsystem, a memory subsystem and a processor subsystem. In addition, the one or more access points 112, the one or more radio nodes 114 and the one or more electronic devices 116 may include radios 124 in the networking subsystems. More generally, the one or more access points 112, the one or more radio nodes 114 and the one or more electronic devices 116 can include (or can be included within) any electronic devices with the networking subsystems that enable the one or more access points 112, the one or more radio nodes 114 and the one or more electronic devices 116 to wirelessly communicate with each other.

As can be seen in FIG. 1, wireless signals 126 (represented by a jagged line) are transmitted from a radio 124-1 in electronic device 116-1. These wireless signals are received by radio 124-2 in, e.g., access point 112-1 or radio 124-3 in radio node 114-1. In particular, electronic device 116-1 may transmit frames or packets. In turn, these frames or packets may be received by access point 112-1 or radio node 114-1. This may allow electronic device 116-1 to communicate information to access point 112-1 or radio node 114-1. Note that wireless signals 126 may convey Wi-Fi or LTE frames or packets.

The communication between electronic device 116-1 and access point 112-1 or radio node 114-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in the one or more electronic devices 116, the one or more radio nodes 114 and the one or more access points 112, one or more of these instances may be different from the other instances of radios 124.

As noted previously, a plethora of different discrete communication devices, such as access points 112 and radio nodes 114, can increase the cost and complexity of system 110. In order to address this challenge, system 110 may include integrated system 120 with access point 112-1 and radio node 114-1.

However, combining access point 112-1 and radio node 114-1 into a single electronic device may not be preferred by customers, because this electronic device may be bulky and/or may have a high power consumption. Consequently, access point 112-1 and radio node 114-1 may be separate electronic devices in integrated system 120.

In some embodiments, one of these components can supply electrical power and data to the other, so that integrated system 120 has a single external connector or cable. For example, integrated system 120 may receive electrical power and data via an Ethernet cable using, e.g., PoE. In principle, if the Ethernet cable is provided to access point 112-1, a housing between access point 112-1 and radio node 114-1 can provide electrical power from access point 112-1 to radio node 114-1, e.g., using PoE.

Alternatively, the Ethernet cable may be provided to radio node 114-1 and the housing can provide electrical power from radio node 114-1 to access point 112-1, e.g., using PoE. However, this design choice is not trivial. Notably, access point 112-1 may have a maximum transmit power of 20 dBm, while radio node 114-1 may have a transmit power of 24 dBm per chain or an equivalent isotropic radiated power (EIRP) of 30 dBm. Consequently, the power consumption of radio node 114-1 may be much larger than the power consumption of access point 112-1, and thus the temperature of radio node 114-1 may be much larger than that of access point 112-1. For example, the power consumption of access point 112-1 may be 12-13 W, while the power consumption of radio node 114-1 may be approximately 26 W. The prospect of increasing the electrical power conveying through radio node 114-1 (and, thus, the power consumption of radio node 114-1), so that radio node 114-1 can provide electrical power to access point 112-1 will only increase the temperature and the thermal problems in designing integrated system 120. Therefore, having access point 112-1 provide electrical power to radio node 114-1 may seem preferable.

However, in practice some access points do not support outputting PoE. In addition to the added expense, redesigning these access points may not be an option because there may be an installed base of such access points in the field. Consequently, in integrated system 120, radio node 114-1 provides the electrical power and the data to access point 112-1. For example, radio node 114-1 may provide the electrical power and the data to access point 112-1 using PoE.

One challenge with this configuration is that there may be a variety of models or types of access points that can be included in integrated system 120. These different models or types of access points may have different numbers of transmits circuits and, thus, may have different power consumption. For example, access point 112-1 may use 2×2, 3×3 or 4×4 multi-input multi-output (MIMO). Consequently, radio node 114-1 may need to adjust or change the electrical power provided to access point 112-1 based at least in part on a configuration of access point 112-1.

Moreover, radio node 114-1 may need to dynamically adjust or change the electrical power provided to access point 112-1. For example, the electrical power may be dynamically adapted based at least in part: a temperature of radio node 114-1, loading of access point 112-1 (such as a number of associated clients, a utilization of access point 112-1, etc.), current power consumption of radio node 114-1, current power consumption of access point 112-1, modeling of power consumption of radio node 114-1, modeling of power consumption of access point 112-1, modeling of a temperature of radio node 114-1 (such as an average, a mean or a maximum temperature), and/or modeling of a temperature of access point 112-1 (such as an average, a mean or a maximum temperature). For example, the modeling of the power consumption of access point 12-1 may be based at least in part on: the configuration of access point 112-1, the loading of access point 112-1, a data rate of access point 112-1, a throughput of access point 112-1, etc. Furthermore, modeling of the temperature of a given electronic device may be based at least in part on the current power consumption of the given electronic device or modeling of the power consumption of the given electronic device.

Alternatively or additionally, access point 112-1 and/or radio node 114-1 may provide information (such as a configuration, loading, one or more communication performance metrics, etc.) to at least one of the one or more optional controllers 118. In response, and based at least in part on the information, this controller may provide an instruction to radio node 114-1 that specifies the electrical power to be provided to access point 112-1. Then, radio node 114-1 may dynamically modify or adjust the electrical power provided to access point 112-1 based at least in part on the instruction. Thus, the modification or adjustment may be quasi-static or dynamic.

In these ways, the packaging techniques may allow access point 112-1 and radio node 114-1 to be included in integrated system 120. This may simplify and reduce the cost of system 110.

In the described embodiments, processing a frame or a packet in electronic devices 116, radio nodes 114 and/or access points 112 may include: receiving wireless signals 126 with the frame or packet; decoding/extracting the frame or packet from the received wireless signals 126 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more radio nodes 114, the one or more electronic devices 116, and/or the one or more optional controllers 118. As another example, in another embodiment, different electronic devices are transmitting and/or receiving frames or packets.

Figure 2:
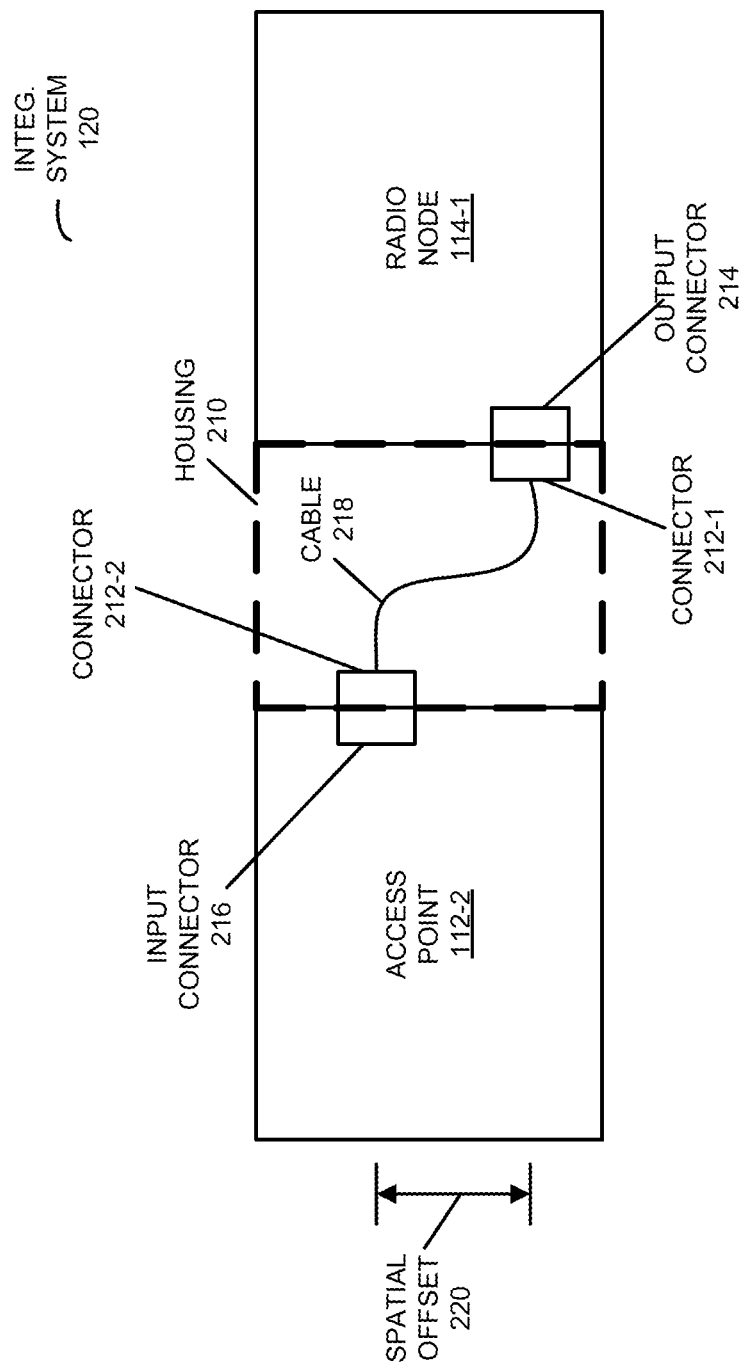
FIG. 2 is a block diagram illustrating an integrated system in accordance with an embodiment of the present disclosure.

FIG. 2 presents a block diagram illustrating an integrated system 120. This integrated system may include: radio node 114-1 that communicates using a cellular-telephone communication protocol (such as LTE); and access point 112-1 that communicates using an IEEE 802.11 communication protocol (such as Wi-Fi). For example, the IEEE 802.11 communication protocol may be compatible with: IEEE 802.11a, IEEE 802.11b, IEEE 802.11g, IEEE 802.11n, IEEE 802.11ac, IEEE 802.11ad, IEEE 802.11ax, IEEE 802.11be, or another IEEE 802.11 standard.

Moreover, integrated system 120 may include a housing 210 between radio node 114-1 and access point 112-1, where housing 210 provides mechanical coupling and electrical coupling between radio node 114-1 and access point 112-1, and housing 210 provides electrical power and data to access point 112-1 from radio node 114-1. For example, housing 210 may provide the electrical power and the data using PoE.

Furthermore, the mechanical coupling may include rigid mechanical coupling and/or remateable mechanical coupling. For example, housing 210 made be fabricated from a hard plastic and the mechanical coupling may be implemented using fasteners, clips, screws and nuts and/or integrated screws and/or female receptacles in housing 210. Note that, when mechanically coupled to housing 210, radio node 114-1 and access point 112-1 may have a common form factor.

Additionally, housing 210 may include connectors 212 and a cable 218 (such as an Ethernet cable). Connector 212-1 may couple to an output connector 214 from radio node 114-1 and to cable 218, and connector 212-2 may couple to cable 218 and to an input connector 216 to access point 112-1. Note that positions of connectors 212 may correct for a spatial offset 220 in the positions of output connector 214 and input connector 216.

In some embodiments, radio node 114-1 may dynamically modify or adjust the electrical power provided to access point 112-1 based at least in part on: a temperature of radio node 114-1, a configuration of access point 112-1, loading of radio node 114-1, loading of access point 112-1, current power consumption of radio node 114-1, current power consumption of access point 112-1, modeling of power consumption of radio node 114-1, modeling of power consumption of access point 112-1, modeling of a temperature of radio node 114-1, and/or modeling of a temperature of access point 112-1.

Alternatively or additionally, radio node 114-1 may receive, from a controller, an instruction specifying the electrical power to be provided to access point 112-1. Then, radio node 114-1 may dynamically modify or adjust the electrical power provided to access point 112-1 based at least in part on the instruction.

In some embodiments, integrated system 120 may include: fewer or additional components, two or more components may be combined into a single component, and/or a position of at least one of the components may be changed.

Figure 3:
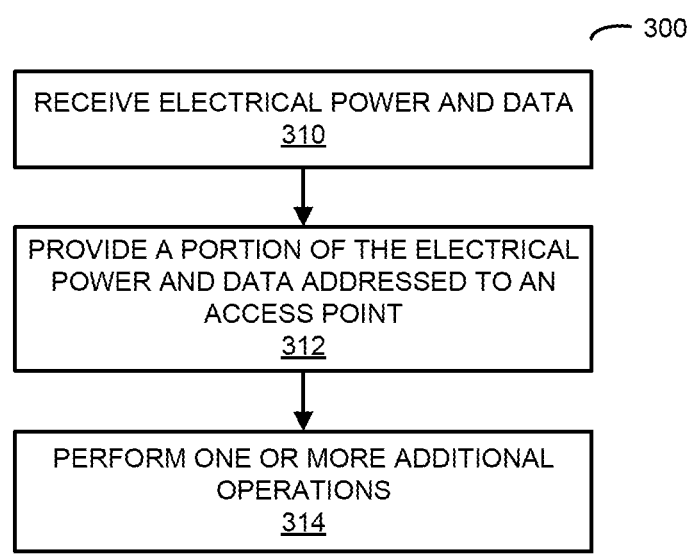
FIG. 3 is a flow diagram illustrating a method for operating the integrated system in FIG. 1 in accordance with an embodiment of the present disclosure.

We now describe embodiments of the method. FIG. 3 presents a flow diagram illustrating a method for operating an integrated system, such as integrated system 120 in FIG. 1. During operation, a radio node in the integrated system may receive electrical power and data (operation 310). Then, the radio node may provide a portion of the electrical power and data (operation 312) addressed to an access point in the integrated system to the access point. For example, the electrical power and the data may be received on an Ethernet cable, and the portion of the electrical power and the data addressed to the access point may be provided using PoE.

In some embodiments, the radio node performs one or more additional optional operations (operation 314). For example, the radio node may dynamically adjust the portion of the electrical power provided to the access point.

Alternatively or additionally, the radio node may receive, from a controller, an instruction specifying the electrical power to be provided to the access point. Then, the radio node may dynamically modify or adjust the electrical power provided to the access point based at least in part on the instruction.

In some embodiments of method 300, there may be additional or fewer operations. Moreover, the order of the operations may be changed, and/or two or more operations may be combined into a single operation.

For example, while FIG. 3 illustrates the radio node performing the operations in method 300, as described previously, in other embodiments at least some of the operations in method 300 are performed by a computer (such as a controller).

Figure 4:
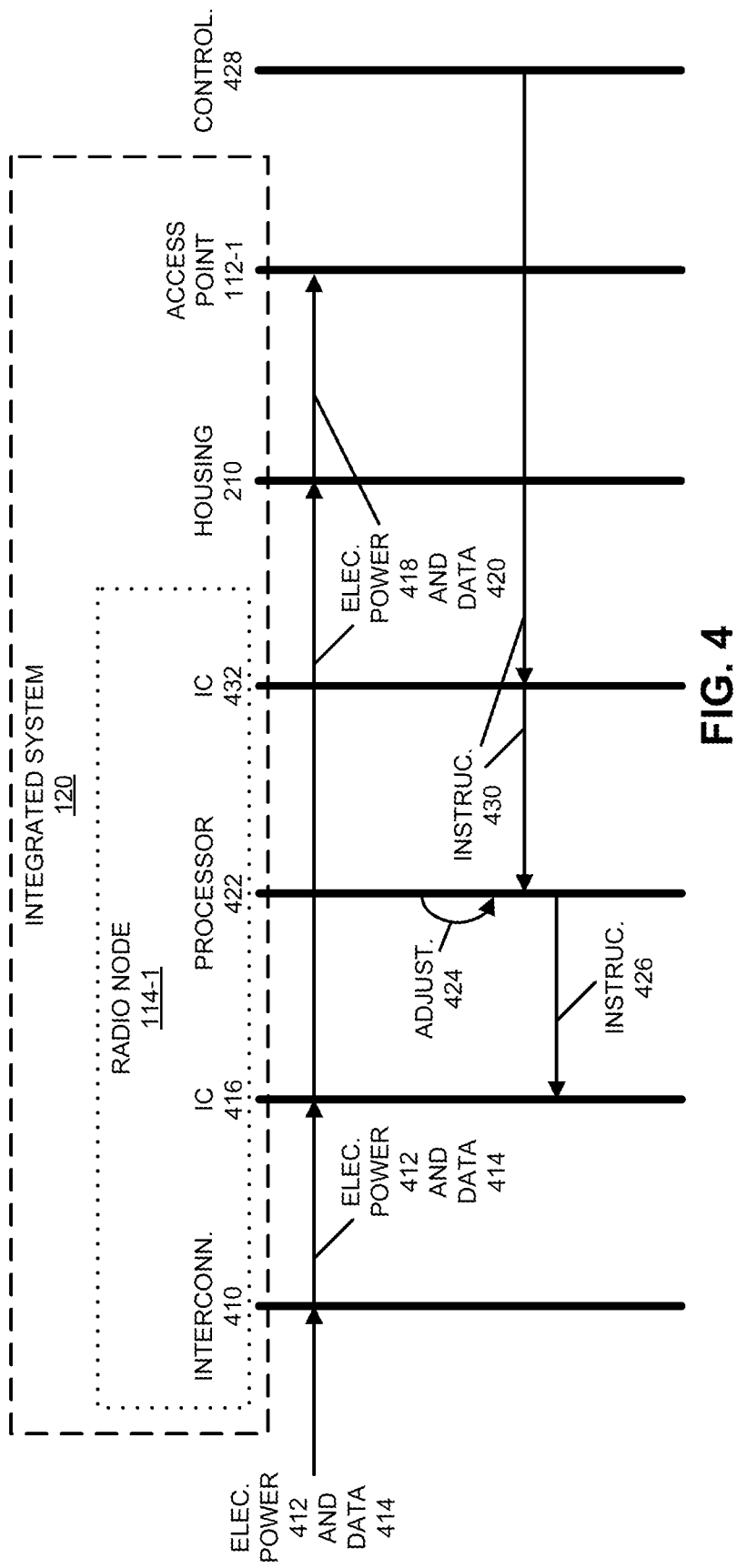
FIG. 4 is a drawing illustrating an example of communication between a radio node and an access point in the integrated system in FIG. 1 in accordance with an embodiment of the present disclosure.

Embodiments of the packaging technique are further illustrated in FIG. 4, which presents a drawing illustrating an example of communication between radio node 114-1 and access point 112-1 in integrated system 120. Notably, interconnect 410 in radio node 114-1 may receive electrical power 412 and data 414. Then, integrated circuit (IC) 416 may provide a portion of the electrical power 418 and data 420 addressed to access point 112-1 to access point 112-1, e.g., via housing 210.

In some embodiments, processor 422 in radio node 114-1 may determine a dynamic adjustment 424 to the portion of the electrical power 418 provided to access point 112-1, and may provide an instruction 426 to integrated circuit 416 to accordingly adjust the portion of the electrical power 418 provided to access point 112-1. Alternatively or additionally, controller 428 may provide an instruction 430 specifying the portion of the electrical power 418 to be provided to access point 112-1. After receiving instruction 430, interface circuit 432 in radio node 114-1 may provide instruction 430 to processor 422 in radio node 114-1. Moreover, based at least in part on instruction 430, processor 422 may instruct 426 integrated circuit 416 to accordingly adjust the portion of the electrical power 418 provided to access point 112-1.

While FIG. 4 illustrates communication between components using unidirectional or bidirectional communication with lines having single arrows or double arrows, in general the communication in a given operation in this figure may involve unidirectional or bidirectional communication.

Figure 5:
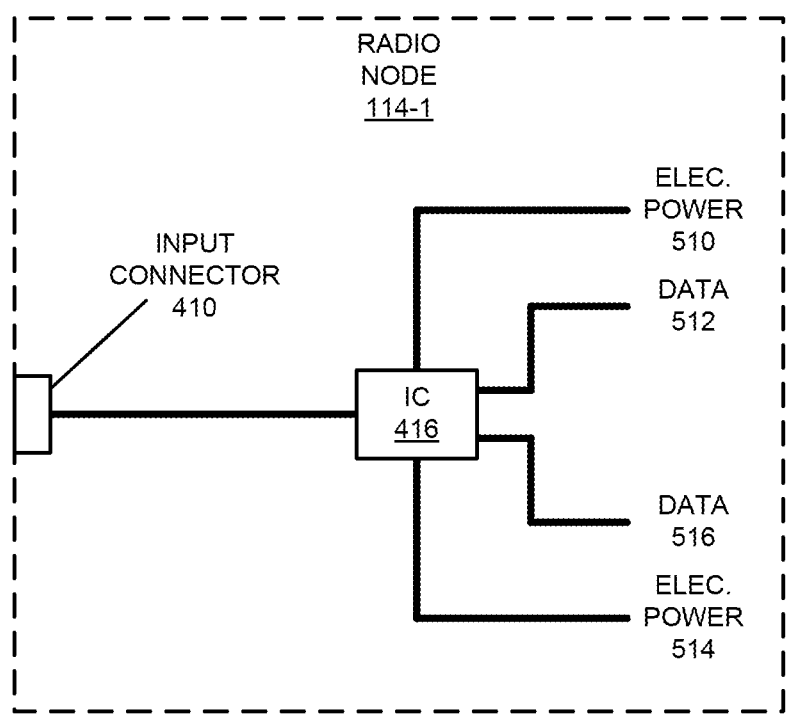
FIG. 5 is drawing illustrating an example of splitting of power and data for a radio node and an access point in the integrated system in FIG. 1 in accordance with an embodiment of the present disclosure.

FIG. 5 presents drawing illustrating an example of splitting of power and data for radio node 114-1 and access point 112-1 in integrated system 120 in FIG. 1. Notably, in some embodiments, radio node 114-1 may receive electrical power and data on input connector or interconnect 410, e.g., from an Ethernet cable.

Then, integrated circuit 416 may split or divide the electrical power and data for radio node 114-1 and access point 112-1. Notably, integrated circuit 416 may provide electrical power 510 for radio node 114-1 and data 512 addressed to radio node 114-1, and may provide electrical power 514 for access point 112-1 and data 516 addressed to access point 112-1. In some embodiments, data 512 and 516 may be port mapped.

We now describe embodiments of an electronic device, which may perform at least some of the operations in the packaging techniques. For example, the electronic device may include a component in system 110, such as one of: the one or more access points 112, the one or more radio nodes 114, the one or more electronic devices 116 and/or the one or more optional controllers 118. FIG. 6 presents a block diagram illustrating an electronic device 600 in accordance with some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, graphical processor units (GPUs) and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory (which collectively or individually are sometimes referred to as a 'computer-readable storage medium'). In some embodiments, instructions for processing subsystem 610 in memory subsystem 612 include: one or more program modules or sets of instructions (such as program instructions 622 or operating system 624), which may be executed by processing subsystem 610. Note that the one or more computer programs may constitute a computer-program mechanism. Moreover, instructions in the various program instructions in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as nodes 608, e.g., a pad, which can be coupled to the one or more antennas 620. Thus, electronic device 600 may or may not include the one or more antennas 620.) For example, networking subsystem 614 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 600 may be adapted or changed using pattern shapers (such as reflectors) in one or more antennas 620 (or antenna elements), which can be independently and selectively electrically coupled to ground to steer the transmit antenna radiation pattern in different directions. Thus, if one or more antennas 620 includes N antenna-radiation-pattern shapers, the one or more antennas 620 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 4 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting frames and/or scanning for frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, an access point, a transceiver, a controller, a radio node, a router, a switch, communication equipment, an access point, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 614. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, packaging techniques may be used. Thus, the packaging techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the packaging techniques may be implemented using program instructions 622, operating system 624 (such as a driver for interface circuit 618) or in firmware in interface circuit 618. Alternatively or additionally, at least some of the operations in the packaging techniques may be implemented in a physical layer, such as hardware in interface circuit 618.

Moreover, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 6 GHz, 60 GHz, and/or a band of frequencies used by the CBRS or by LTE. In some embodiments, the communication between electronic devices uses multi-user transmission (such as orthogonal frequency division multiple access or OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the packaging techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A housing, comprising:
   an input connector configured to electrically couple to a radio node;
   a cable electrically coupled to the input connector; and
   an output connector, electrically coupled to the cable, configured to electrically couple to an access point,
   wherein the housing is configured to provide mechanical coupling and electrical coupling between the radio node and the access point,
   wherein the housing is configured to provide electrical power and data to the access point from the radio node, and
   wherein the radio node is configured to dynamically adjust the electrical power provided to the access point based at least in part on one or more of: a temperature of the radio node, a configuration of the access point, loading of the radio node, loading of the access point, current power consumption of the radio node, current power consumption of the access point, modeling of power consumption of the radio node, modeling of power consumption of the access point, modeling of the temperature of the radio node, or modeling of a temperature of the access point.

2. The housing of claim 1, wherein the housing is configured to provide the electrical power and the data using Power over Ethernet (PoE).

3. The housing of claim 1, wherein the mechanical coupling comprises rigid mechanical coupling.

4. The housing of claim 1, wherein the mechanical coupling comprises remateable mechanical coupling.

5. The housing of claim 1, wherein the input connector and the output connector correct for a spatial offset in the positions of corresponding connectors in the radio node and the access point.

6. The housing of claim 1, wherein, when mechanically coupled to the housing, the radio node and the access point have a common form factor.

7. An integrated system, comprising:
   a radio node configured to communicate using a cellular-telephone communication protocol;
   an access point configured to communicate using an Institute of Electrical and Electronics Engineers (IEEE) 802.11 communication protocol; and
   a housing between the radio node and the access point, wherein the housing provides mechanical coupling and electrical coupling between the radio node and the access point,
   wherein the housing is configured to provide electrical power and data to the access point from the radio node, and
   wherein the radio node is configured to dynamically adjust the electrical power provided to the access point based at least in part on one or more of: a temperature of the radio node, a configuration of the access point, loading of the radio node, loading of the access point, current power consumption of the radio node, current power consumption of the access point, modeling of power consumption of the radio node, modeling of power consumption of the access point, modeling of the temperature of the radio node, or modeling of a temperature of the access point.

8. The integrated system of claim 7, wherein the housing is configured to provide the electrical power and the data using Power over Ethernet (PoE).

9. The integrated system of claim 7, wherein the mechanical coupling comprises rigid mechanical coupling.

10. The integrated system of claim 7, wherein the mechanical coupling comprises remateable mechanical coupling.

11. The integrated system of claim 7, wherein the housing comprises connectors that couple to an output connector from the radio node and an input connector to the access point, and
    wherein the connectors correct for a spatial offset in the positions of the output connector and the input connector.

12. The integrated system of claim 7, wherein, when mechanically coupled to the housing, the radio node and the access point have a common form factor.

13. The integrated system of claim 7, wherein the radio node is configured to:

receive, from a controller, an instruction specifying the electrical power to be provided to the access point; and dynamically adjust the electrical power provided to the access point based at least in part on the instruction.

14. The integrated system of claim 7, wherein the radio node comprises: an Evolved Node B (eNodeB), a Universal Mobile Telecommunications System (UMTS) NodeB and radio network controller (RNC), or a New Radio (NR) gNB or gNodeB.

15. The integrated system of claim 7, wherein the radio node and the access point are separate, discrete electronic devices in the integrated system.

16. A method for operating an integrated system, comprising:

by a radio node in the integrated system, wherein the radio node communicates using a cellular-telephone communication protocol:

receiving electrical power and data;

providing a portion of the electrical power and data addressed to an access point in the integrated system to the access point, wherein the access point communicates using an Institute of Electrical and Electronics Engineers (IEEE) 802.11 communication protocol; and dynamically adjusting, using the radio node, the portion of the electrical power provided to the access point based at least in part on one or more of: a temperature of the radio node, a configuration of the access point, loading of the radio node, loading of the access point, current power consumption of the radio node, current power consumption of the access point, modeling of power consumption of the radio node, modeling of power consumption of the access point, modeling of the temperature of the radio node, or modeling of a temperature of the access point.

17. The method of claim 16, wherein the electrical power and the data are received on an Ethernet cable, and the portion of the electrical power and the data addressed to the access point are provided using Power over Ethernet (PoE).

18. The method of claim 16, wherein the method comprises dynamically adjusting the portion of the electrical power provided to the access point.

19. The method of claim 16, wherein the method comprises:

receiving, associated with a controller, an instruction specifying the electrical power to be provided to the access point; and dynamically adjusting the electrical power provided to the access point based at least in part on the instruction.

20. The method of claim 16, wherein the radio node comprises: an Evolved Node B (eNodeB), a Universal Mobile Telecommunications System (UMTS) NodeB and radio network controller (RNC), or a New Radio (NR) gNB or gNodeB.

* * * * *